E. V. MÉLINE.
MACHINE FOR PULLING OR RAISING POTATOES BY EJECTION.
APPLICATION FILED AUG. 4, 1908.

947,451.

Patented Jan. 25, 1910.

4 SHEETS—SHEET 1.

WITNESSES
W. P. Burke
A. F. Heuman

INVENTOR
Edmond Victor Méline
By Wm Wallace White
ATTY.

E. V. MÉLINE.
MACHINE FOR PULLING OR RAISING POTATOES BY EJECTION.
APPLICATION FILED AUG. 4, 1908.

947,451.

Patented Jan. 25, 1910.

4 SHEETS—SHEET 2.

WITNESSES
W. P. Burk
A. F. Heuman

INVENTOR
Edmond Victor Méline
BY Wm. Wallace White
ATTY.

E. V. MÉLINE.
MACHINE FOR PULLING OR RAISING POTATOES BY EJECTION.
APPLICATION FILED AUG. 4, 1908.

947,451.

Patented Jan. 25, 1910.

4 SHEETS—SHEET 3.

WITNESSES
W. P. Burke
A. F. Heuman

INVENTOR
Edmond Victor Méline
BY Wm Wallace White
ATTY

E. V. MÉLINE.
MACHINE FOR PULLING OR RAISING POTATOES BY EJECTION.
APPLICATION FILED AUG. 4, 1908.
947,451.
Patented Jan. 25, 1910.
4 SHEETS—SHEET 4.
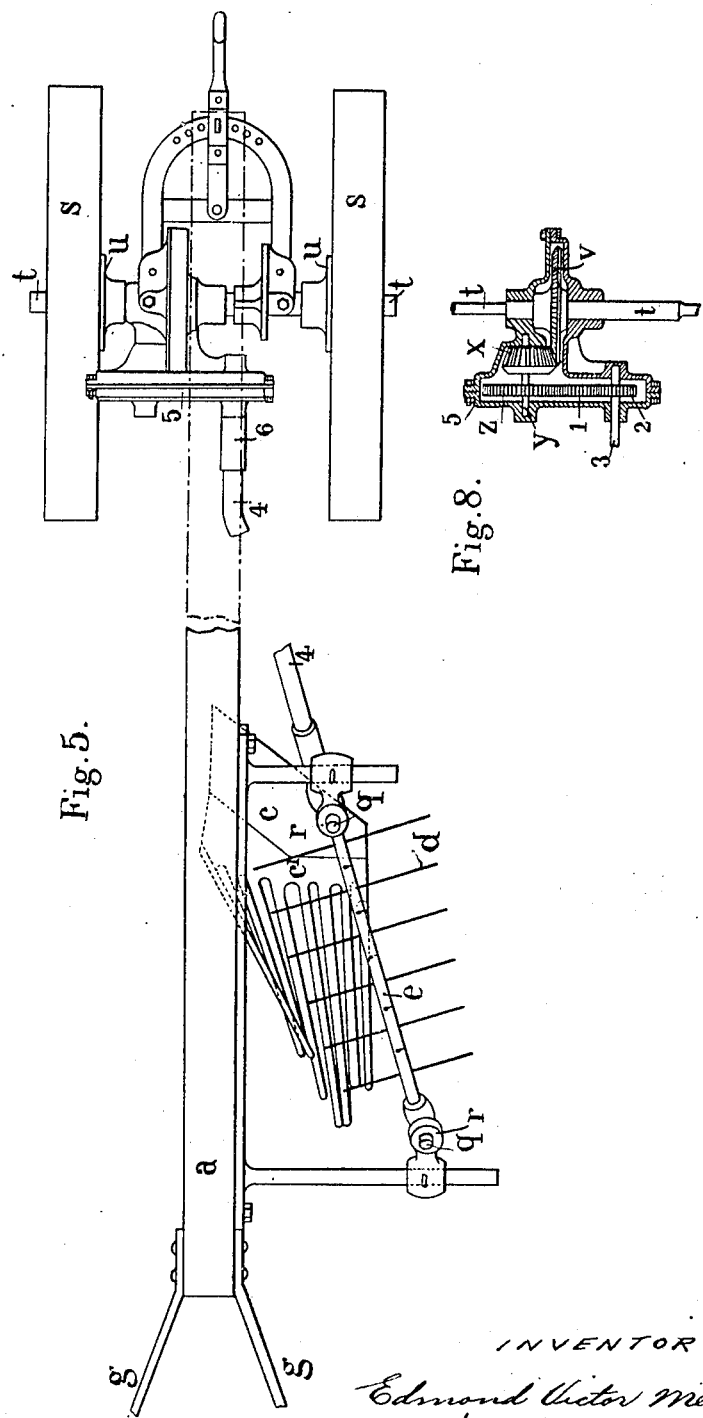

UNITED STATES PATENT OFFICE.

EDMOND VICTOR MÉLINE, OF EPINAL, FRANCE.

MACHINE FOR PULLING OR RAISING POTATOES BY EJECTION.

947,451.  Specification of Letters Patent.  Patented Jan. 25, 1910.

Application filed August 4, 1908. Serial No. 446,982.

*To all whom it may concern:*

Be it known that I, EDMOND VICTOR MÉLINE, of 12 Rue du Paquis and Place Leopold, Epinal, Vosges, Republic of France, mechanical builder, have invented a Machine for Pulling or Raising Potatoes by Ejection, of which the following is a full, clear, and exact description.

The present invention relates to a machine for pulling or raising potatoes in which a sorting and separating shaft provided with pins or prongs is actuated, either by a driving wheel or by a driving wheel-carriage in front, by means of driving gear which causes it to rotate at a definite speed proportional to that of the vehicle; this shaft, which is arranged obliquely in the longitudinal direction of the machine in combination with a breast or mold-board and a plow share, has for its object to disintegrate by the aid of its pins or prongs the strip of earth raised by the share as the said strip advances over the mold-board, at the same time throwing to one side the potatoes to be harvested.

Figure 7:
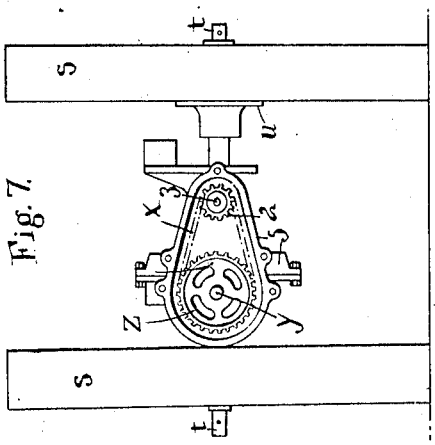
Figure 4:
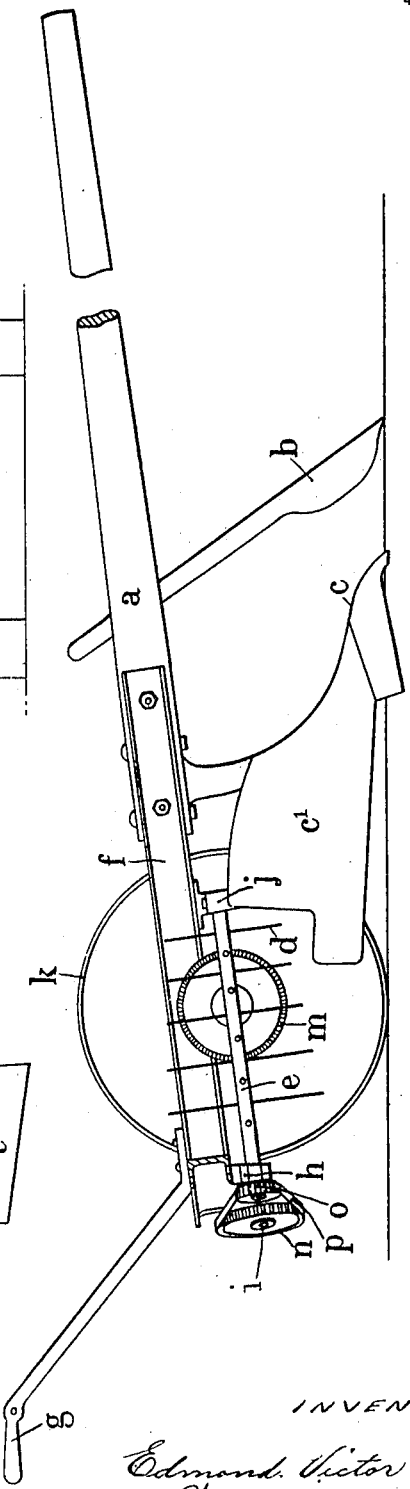
Figure 6:
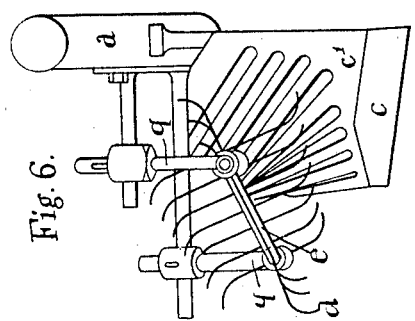
Figure 3:
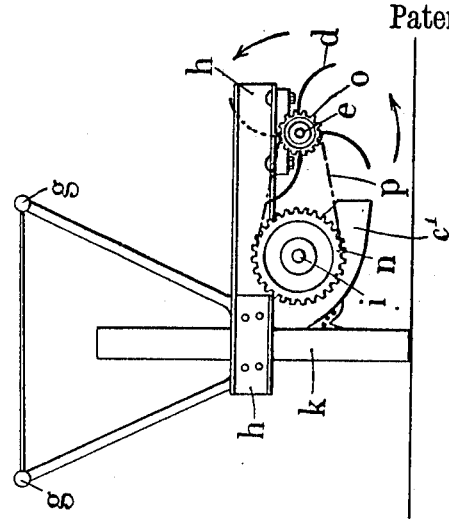
Figure 2:
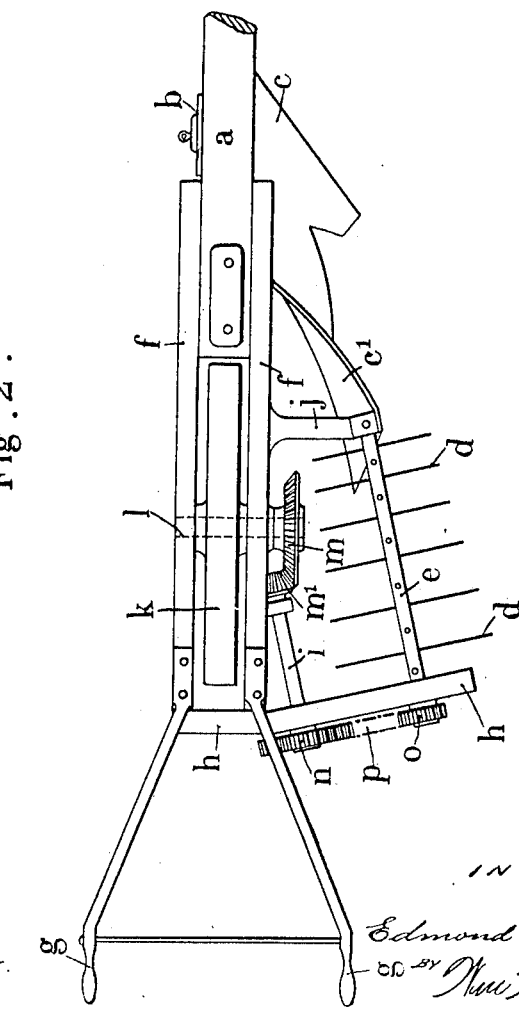
Figure 4:
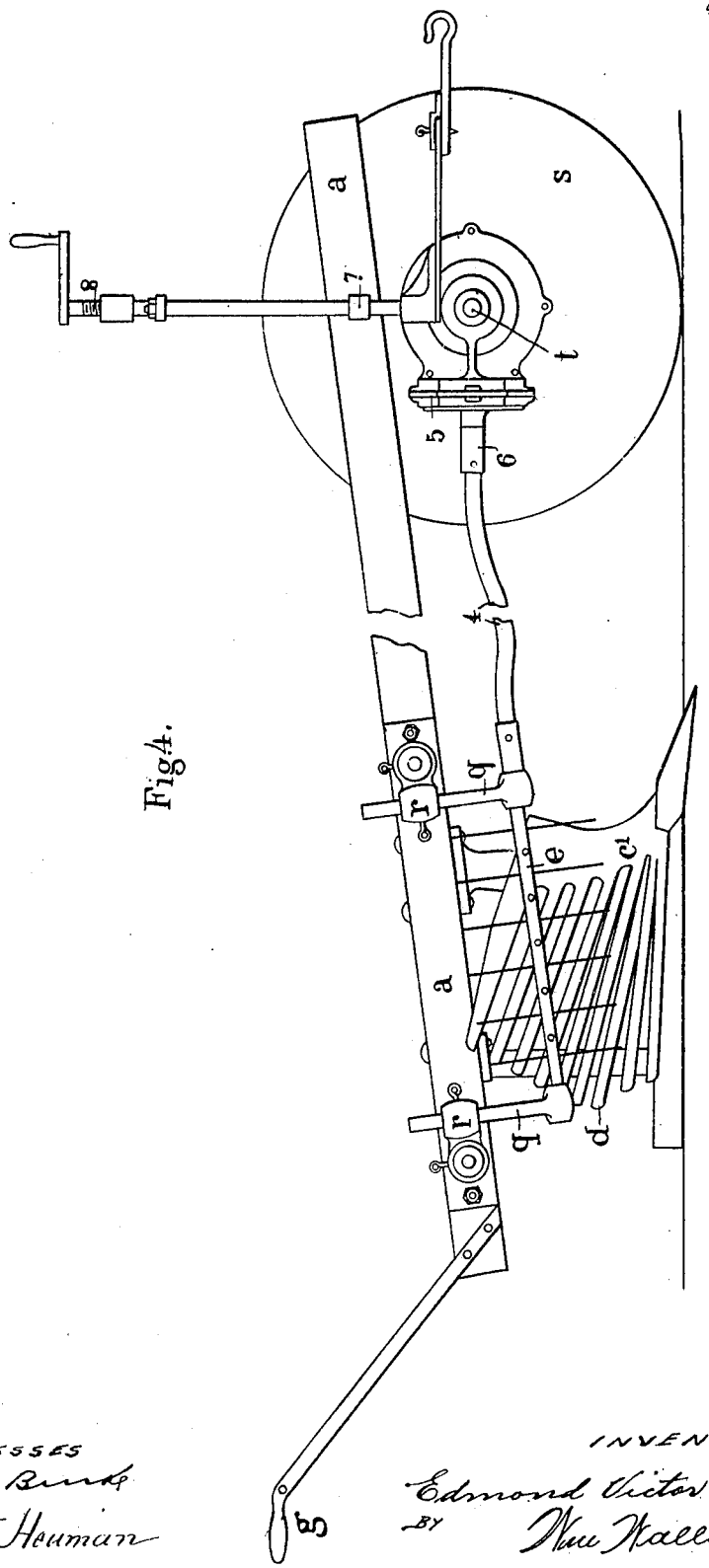

The said invention will be hereinafter described with reference to the accompanying drawings in which:

Figure 1 is an elevation of the machine; Fig. 2 is a corresponding plan thereof; Fig. 3 is a rear view of the said machine; Fig. 4 shows, in side elevation, a modification of the said machine with a wheel-carriage in front; Fig. 5 is a plan thereof; Fig. 6 is an end view of the rear part; Fig. 7 is an end view showing a part of the driving mechanism of the sorting and separating shaft; Fig. 8 is a horizontal section of the driving mechanism of the sorting and separating shaft.

As shown in this drawing, this machine comprises a plow-beam $a$ provided like an ordinary plow with the colter $b$, the share $c$ and the helicoidal breast or mold-board $c'$. The mold-board (Figs. 1 to 3) is suitably recessed at the rear and is of helicoidal form specially designed to permit the passage of the first few pins or prongs $d$ of the separating and sorting shaft $e$. Moreover, by reason of this arrangement, the strip of earth raised by the share and brought over the mold-board by the advance of the machine, as a result of the helicoidal form of the mold-board, cannot turn completely over; thus this strip of earth has only made a quarter of a revolution on itself when the leading pins or prongs of the sorting and separating shaft commence to disintegrate it.

At the end of the beam $a$ behind the colter and above the share, is fixed a frame $f$, formed of two U-iron longitudinal members bolted parallel to each other on to the rear part of the beam $a$. This frame terminates in two handles $g$ serving to guide the machine and in a transverse U-iron $h$ supporting the bearings of the transmission-shaft $i$ and of the sorting and separating shaft $e$, the latter being supported at the other end by a bracket $j$ fixed to the corresponding longitudinal member $f$ and to the mold-board $c'$.

Between the two longitudinal members $f$ is the driving wheel $k$, $e$, $g$ of iron plate, the shaft $l$ of which turns in bearings fixed to the frame. This shaft bears a bevel-wheel $m$ which transmits the motion to the sorting and separating shaft $e$ by means of a pinion $m'$ the oblique shaft $i$ and two sprocket-wheels $n$, $o$, over which passes an endless chain $p$. The pins or prongs $d$ of the sorting and separating shaft are curved and of a length which increases from the front to the rear of the machine. This shaft turns at a definite speed in the direction indicated by the arrows.

Steel gear cases protect the gear and sprocket-wheels of the transmission gearing.

The operation of the machine is as follows: The plow-beam $a$ bearing the share and the mold-board is fixed to a fore- or wheel-carriage of suitable height for regulating the depth of penetration of the share according to the nature of the soil, as in any ordinary plow. At the moment when traction is applied to the machine by a team or by any mechanical means, the colter and the share sink down into the soil and raise the strip of earth containing the tubers to be harvested. This strip of earth, by reason of the advance of the machine, rises on to the mold-board and at the moment when it commences to turn over, it is seized by the leading pins or prongs of the sorting and separating shaft turning at a high speed by the proportional advance of the driving wheel. The disintegration is effected immediately and becomes more marked as the machine advances, the circumferential speed gradually increasing in accordance with the greater and greater length of the pins or prongs. The strip of earth brought into the radius of action of the sorting and separating shaft is pulverized and crumbled up; the small plants or foliage which it contains is delivered into the furrow with the disintegrated earth, which thus fills it up, while the potatoes by reason of their mass and of the action of the centrifugal force, are immediately thrown to one side and fall on to the ground, where it only remains to pick them up.

A kind of movable basket running on wheels can be fixed to the machine to collect the tubers as they are thrown to one side.

By reason of the round section of the pins or prongs and of their curved form, which causes them to work tangentially, and also of the rapid rotation of the sorting and separating shaft, the potatoes are simply freed from the matter adhering thereto and from their roots and are thrown to one side by the simple action of the centrifugal force without being damaged in any way. The gradual action of the sorting and separating shaft insures perfect harvesting of all the potatoes contained in the strip of earth raised by the combined share and moldboard; on the other hand no fault of operation caused by blows or stoppages of the machine is to be feared, the use of a single driving wheel which works continually on a smooth piece of ground leveled by the share which goes in front of it, renders the adhesion of this wheel perfect and constant, which enables a perfectly uniform drive to be obtained. Finally, the longitudinal arrangement of the sorting and separating shaft thus working externally and at the side of the machine prevents any possibility of clogging and stoppage from this cause, which is always to be feared in machines where the sorting is effected by a transverse arrangement working toward the rear. Moreover, with this machine it is possible to harvest a whole field without having to pick up the potatoes as they are raised; the work of raising always taking place circularly from the same side until the center of the field is reached and the land being brought back into condition, the scattered potatoes do not run any risk of being trampled upon or damaged as they are liable to be when using a machine in which they are discharged to the rear after being raised.

This machine may be used as an ordinary plow.

In the modification shown in Figs. 4 to 8 of the drawing, the combined share and mold-board $c'$ is made in the form of a grid at its rear part in order to permit, according to the nature of the soil, the rapid disposal through this grid of a large part of the earth raised by the share $c$ and thus to render easier the raising and the ejection of the potatoes to one side by the rotary motion of the sorting and separating shaft $e$.

The sorting and separating shaft $e$ is provided with supporting rods $q$, which are capable of sliding in brackets $r$ so as to permit this shaft to be moved in a horizontal and in a vertical plane. This method of suspending the sorting and separating shaft moreover permits regulation of the inclination and the vertical distance thereof relatively to the share according to the nature of the soil to be worked.

This machine may moreover comprise a driving fore- or wheel-carriage for actuating the sorting and separating shaft. This wheel-carriage is provided with two driving wheels $s$, $s$ driving the axle $t$ by free-wheel clutches $u$ forming a differential gear. For this purpose, there is keyed on the axle a bevel wheel $v$ actuating a pinion $x$ keyed on the shaft $y$. The shaft $y$ in its turn drives a sprocket-wheel $z$ which, by means of a chain 1, transmits the motion to a second sprocket-wheel 2, the shaft 3 of which is connected to a flexible shaft 4 driving the sorting and separating shaft directly.

All the gears are inclosed in a single gear-case 5 and have the velocity-ratios indicated above in connection with the first form of construction.

The flexible shaft 4 is provided with a feathered socket or coupling 6 or any other suitable arrangement for enabling it to be detached from the shaft 3 and to remain fixed only to the sorting and separating shaft $e$.

A collar 7 movable by means of a screw 8 as in the wheel-carriages of plows, enables the penetration of the share to be adjusted by the greater or less inclination of the plow-beam $a$.

In addition to the advantages offered by the employment of the mold-board with a grid and the adjusting arrangement for the sorting and separating shaft, the wheel-carriage drive enabling the driving wheel and the gearing fixed to the plow-beam to be dispensed with, makes the machine much lighter and facilitates the handling thereof.

Claim:

1. A potato digger, comprising a beam, a plow share thereon, a shaft secured to one side of the beam and inclined relatively to the beam, prongs carried on said shaft, some of said prongs being of less length than the others, and means for rotating the shaft.

2. A potato digger comprising a beam, a plow share thereon, arms extending from one side of the beam over the share, brackets sliding on the said arms, vertical arms adjustably carried in said brackets, a shaft rotatably mounted in the lower end of said vertical arms, prongs carried by said shaft, and means for rotating the shaft.

The foregoing specification of my machine for pulling or raising potatoes by ejection signed by me this 24th day of July 1908.

EDMOND VICTOR MÉLINE.

Witnesses:
H. C. COXE,
R. EHIRIOT.